(12) United States Patent
Geskes

(10) Patent No.: US 8,002,022 B2
(45) Date of Patent: Aug. 23, 2011

(54) HEAT EXCHANGER, IN PARTICULAR EXHAUST GAS HEAT EXCHANGER FOR MOTOR VEHICLES

(75) Inventor: Peter Geskes, Ostfildern (DE)

(73) Assignee: BEHR GmbH & Co. KG, Stuttgart (DE)

( * ) Notice: Subject to any disclaimer, the term of this patent is extended or adjusted under 35 U.S.C. 154(b) by 307 days.

(21) Appl. No.: 12/067,136

(22) PCT Filed: Sep. 14, 2006

(86) PCT No.: PCT/EP2006/008940
§ 371 (c)(1),
(2), (4) Date: May 9, 2008

(87) PCT Pub. No.: WO2007/031306
PCT Pub. Date: Mar. 22, 2007

(65) Prior Publication Data
US 2008/0277105 A1 Nov. 13, 2008

(30) Foreign Application Priority Data
Sep. 16, 2005 (DE) .......................... 10 2005 044 290

(51) Int. Cl.
*F28D 7/00* (2006.01)
(52) U.S. Cl. ........................................ 165/157; 165/158
(58) Field of Classification Search .................. 165/158, 165/178, 51, 157; 123/568.12
See application file for complete search history.

(56) References Cited

U.S. PATENT DOCUMENTS

| | | | |
|---|---|---|---|
| 3,627,039 A | 12/1971 | Tiefenbacher | |
| 4,206,806 A | 6/1980 | Togashi | |
| 4,775,006 A | 10/1988 | Hesse | |
| 5,785,030 A * | 7/1998 | Paas | 60/278 |
| 5,915,472 A * | 6/1999 | Takikawa et al. | 165/158 |
| 6,247,523 B1 * | 6/2001 | Shibagaki et al. | 165/51 |
| 6,321,835 B1 | 11/2001 | Damsohn et al. | |
| 6,390,186 B1 * | 5/2002 | Laudic et al. | 165/158 |
| 6,595,274 B2 * | 7/2003 | Hayashi et al. | 165/158 |
| 6,675,879 B2 | 1/2004 | Voss | |
| 7,290,597 B2 | 11/2007 | Takano | |
| 2001/0037878 A1 | 11/2001 | Brost et al. | |
| 2001/0047861 A1 * | 12/2001 | Maeda et al. | 165/167 |
| 2002/0162651 A1 * | 11/2002 | Nakagome et al. | 165/158 |
| 2005/0067153 A1 | 3/2005 | Wu et al. | |
| 2005/0161206 A1 | 7/2005 | Ambros et al. | |
| 2006/0048759 A1 | 3/2006 | Hendrix et al. | |

FOREIGN PATENT DOCUMENTS

| | | |
|---|---|---|
| CH | 378353 A | 6/1964 |
| DE | 1 551 448 A1 | 4/1970 |
| DE | 36 22 952 A1 | 1/1988 |
| DE | 196 54 368 A1 | 6/1998 |

(Continued)

*Primary Examiner* — Teresa J Walberg
(74) *Attorney, Agent, or Firm* — Foley & Lardner LLP

(57) ABSTRACT

The invention relates to a heat exchanger, in particular an exhaust gas heat exchanger for motor vehicles, having tubes (3) through which a gas can flow, which are arranged in a housing casing (2) and around which a liquid coolant can flow, wherein the tubes (3) have tube ends which are held by tube bases. It is proposed according to the invention that the tubes are embodied as flat tubes (3), and that, at least one side of the tubes (3), the tube ends (3a, 3b) are flared to form an approximately rectangular cross section and can be soldered to the tube bases (7, 8).

16 Claims, 4 Drawing Sheets

FOREIGN PATENT DOCUMENTS

| | | |
|---|---|---|
| DE | 197 34 690 C2 | 2/1999 |
| DE | 199 07 163 A1 | 10/1999 |
| DE | 198 49 449 C2 | 5/2000 |
| DE | 100 58 710 A1 | 6/2001 |
| DE | 100 41 794 A1 | 3/2002 |
| DE | 10 2004 050 567 A1 | 6/2005 |
| DE | 103 59 806 A1 | 7/2005 |
| EP | 0 076 724 A1 | 4/1983 |
| EP | 406774 * | 1/1991 ............ 165/173 |
| EP | 0 677 715 A1 | 10/1995 |
| EP | 1 148 312 A1 | 10/2001 |
| JP | 11-23182 A | 1/1999 |
| JP | 2001-108390 * | 4/2001 ............ 165/158 |
| JP | 2002-168586 A | 6/2002 |
| JP | 2005-188849 A | 7/2005 |
| WO | WO 2004/065874 A1 | 8/2004 |

* cited by examiner

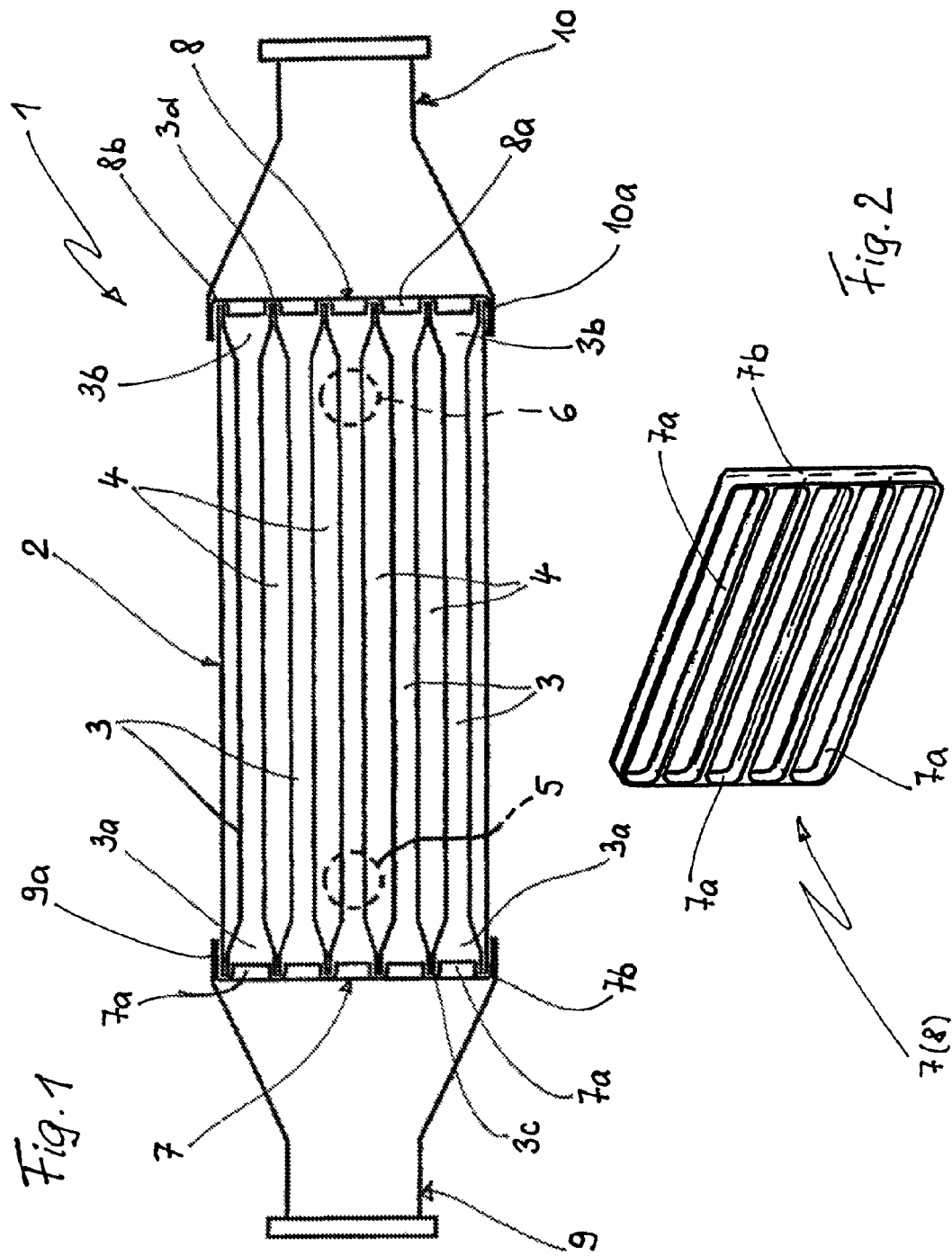

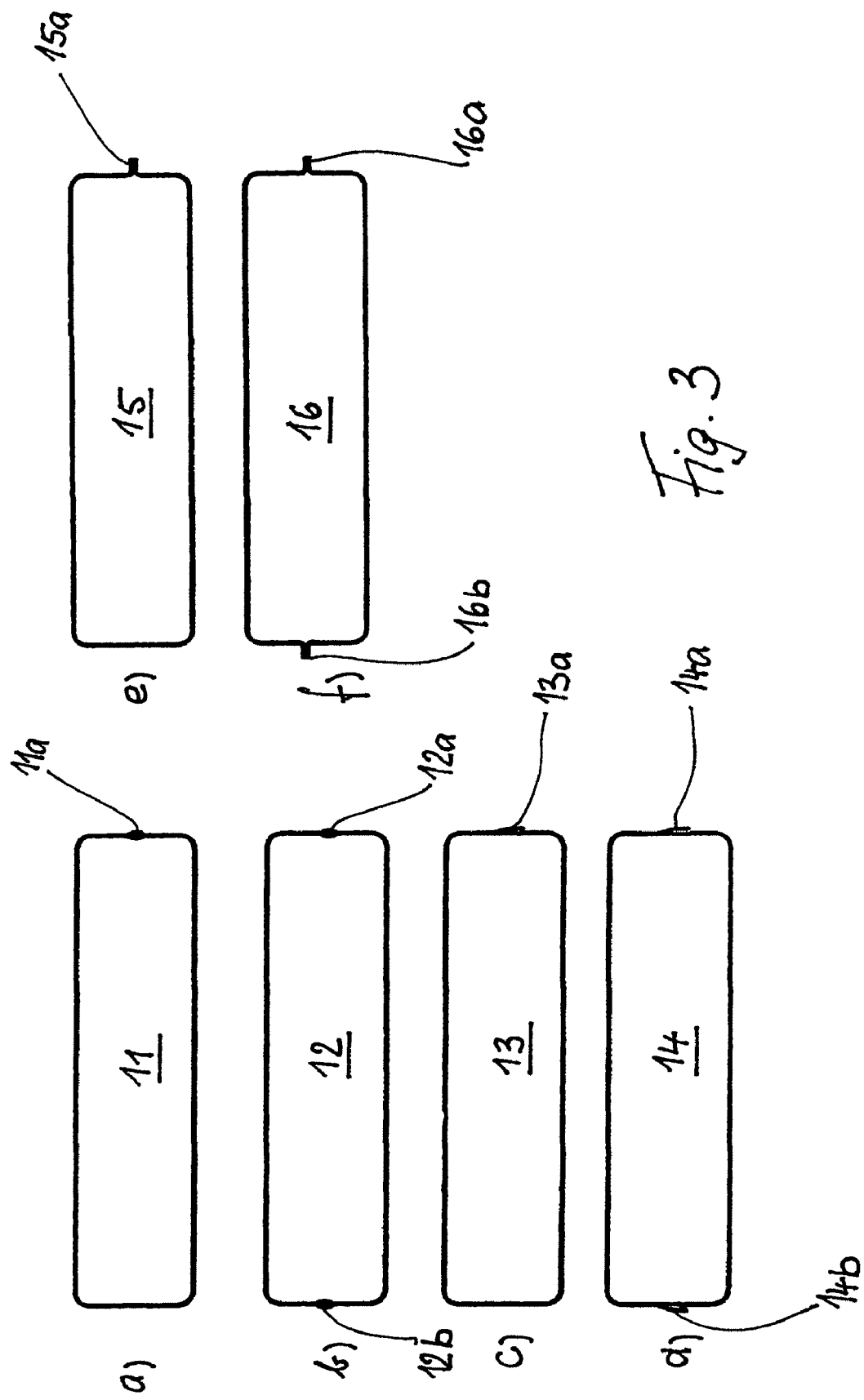

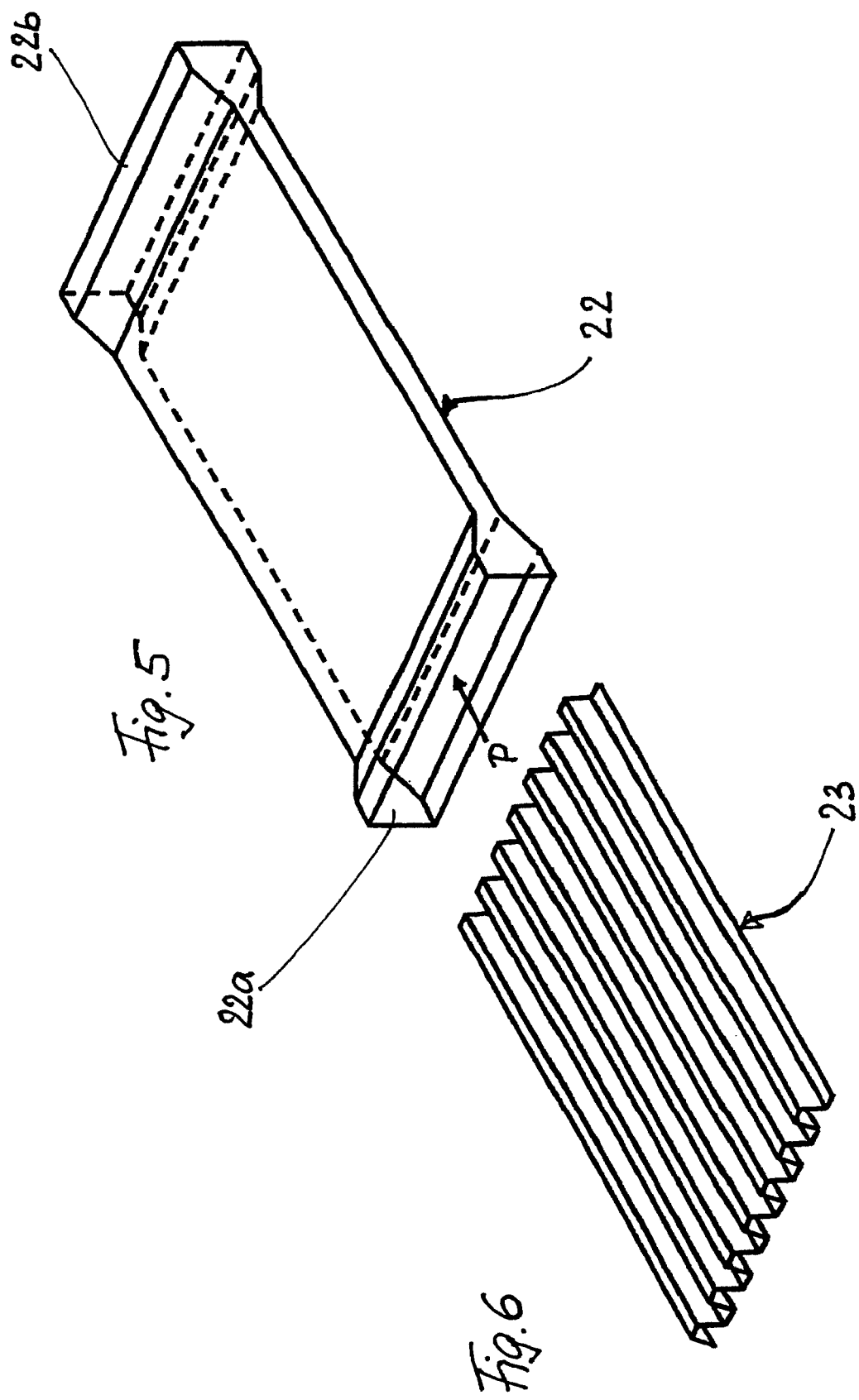

HEAT EXCHANGER, IN PARTICULAR EXHAUST GAS HEAT EXCHANGER FOR MOTOR VEHICLES

The invention relates to a heat exchanger, in particular an exhaust gas heat exchanger for motor vehicles, and to a method for producing a heat exchanger.

BACKGROUND

Heat exchangers which can be used as exhaust gas coolers in the exhaust gas recirculation in motor vehicles are known in various embodiments, for example as welded or soldered constructions. DE 199 07 163 C2 from the applicant has disclosed a welded exhaust gas heat exchanger composed of high-grade steel, in which a bundle of exhaust gas tubes is welded into tube plates and is arranged in a housing casing which can be traversed by liquid coolant. Said design is relatively expensive in particular on account of the diverse welded and laser-welded connections. EP 0 677 715 A1 from the applicant has disclosed an exhaust gas heat exchanger whose individual parts are connected to one another by means of soldering. A disadvantage here, on account of the plurality of individual parts, is the joining, positioning and fixing of the individual parts in preparation for the soldering process.

SUMMARY

It is an object of the present invention to design a heat exchanger of the type specified in the introduction in a soldering-compatible fashion in such a way that it can be produced in a cost-effective manner by means of soldering, if possible in one working step. It is also an object of the invention to specify a cost-effective method for producing a soldered heat exchanger.

It is provided according to the invention that the exhaust gas tubes, which are embodied as flat tubes, are flared at least at one side, specifically to form a rectangular cross section, so that the tube ends bear against one another with their longitudinal sides and can be soldered there. Plugged over the flared tube ends, which are arranged adjacent to one another, is a tube plate which is embodied as a deep-drawn part and which has rectangular rim holes in the shape of the tube ends, with the rim holes engaging into the tube ends. The tube ends can be sealingly soldered to the tube plate, and the tube plate is likewise soldered to the housing casing. The other side of the tube bundle can either be formed in the same way, that is to say with flared tube ends, or can have non-flared tube ends which are plugged into and soldered to a conventional tube plate. It is optionally possible for turbulence inserts or internal corrugated fins to be inserted into and soldered to the exhaust gas tubes, with the insertion advantageously taking place from the side of the flared tube ends. The funnel-shaped widening of the tube ends serves to considerably facilitate the insertion, so that even automatic production is possible. An advantage of the soldered construction according to the invention is that the tubes can be "bundled" in a simple manner, that is to say layered one on top of the other and connected to the tube plates. In addition, it is possible for the housing casing and connecting pieces (diffusers) to be positioned with and fixed to the tube bundle and the tube plates, that is to say be prepared for the soldering process, in a simple manner. Complete soldering of the entire heat exchanger in one working step is therefore possible. This reduces the production costs of the heat exchanger. There is also the advantage that the flared tube ends permit a thermally induced expansion of the tubes with respect to the housing casing. The flared tube ends act in a sense as expansion seams. This prevents the solder seams from fracturing or forming leaks, in particular in the tube plate region.

The tubes, which have a flat rectangular cross section, can be produced in various ways, for example as longitudinal-seam welded tubes with one longitudinal seam or two opposite longitudinal seams. It is also possible for the tubes to be produced with one or two soldered longitudinal seams, for example as folds. In this case, the soldering can take place in one working step with the soldering of the entire heat exchanger. For connecting the parts to one another, solder foils or solder platings are provided at suitable points. Instead of the inserted turbulence devices, it is possible for the tubes, that is to say their sheet metal walls, to also have embossed structural elements, for example in the form of so-called winglets.

The object of the invention is also achieved by means of a method. An advantage of said method is that the flat tubes can be bundled in a simple manner, the fins can be inserted in a simple manner and the entire heat exchanger can, without further auxiliary means, be prepared for soldering in one working step. Said simple method reduces the production costs of the heat exchanger, which can particularly advantageously be used as an exhaust gas heat exchanger or as a charge-air cooler, in each case liquid-cooled.

BRIEF DESCRIPTION OF THE DRAWINGS

Exemplary embodiments of the invention are illustrated in the drawing and are described in more detail below. In the drawing:

FIG. 1 shows, in longitudinal section, a soldered exhaust gas cooler with flared tube ends at both sides, FIG. 2 shows a tube plate, FIGS. 3a-3f show various embodiments of rectangular cross sections of exhaust gas tubes, FIG. 5 shows a single exhaust gas tube with flared tube ends, and FIG. 6 shows an internal corrugated fin for inserting into the exhaust gas tube as per FIG. 5.

DETAILED DESCRIPTION

Figure 4:
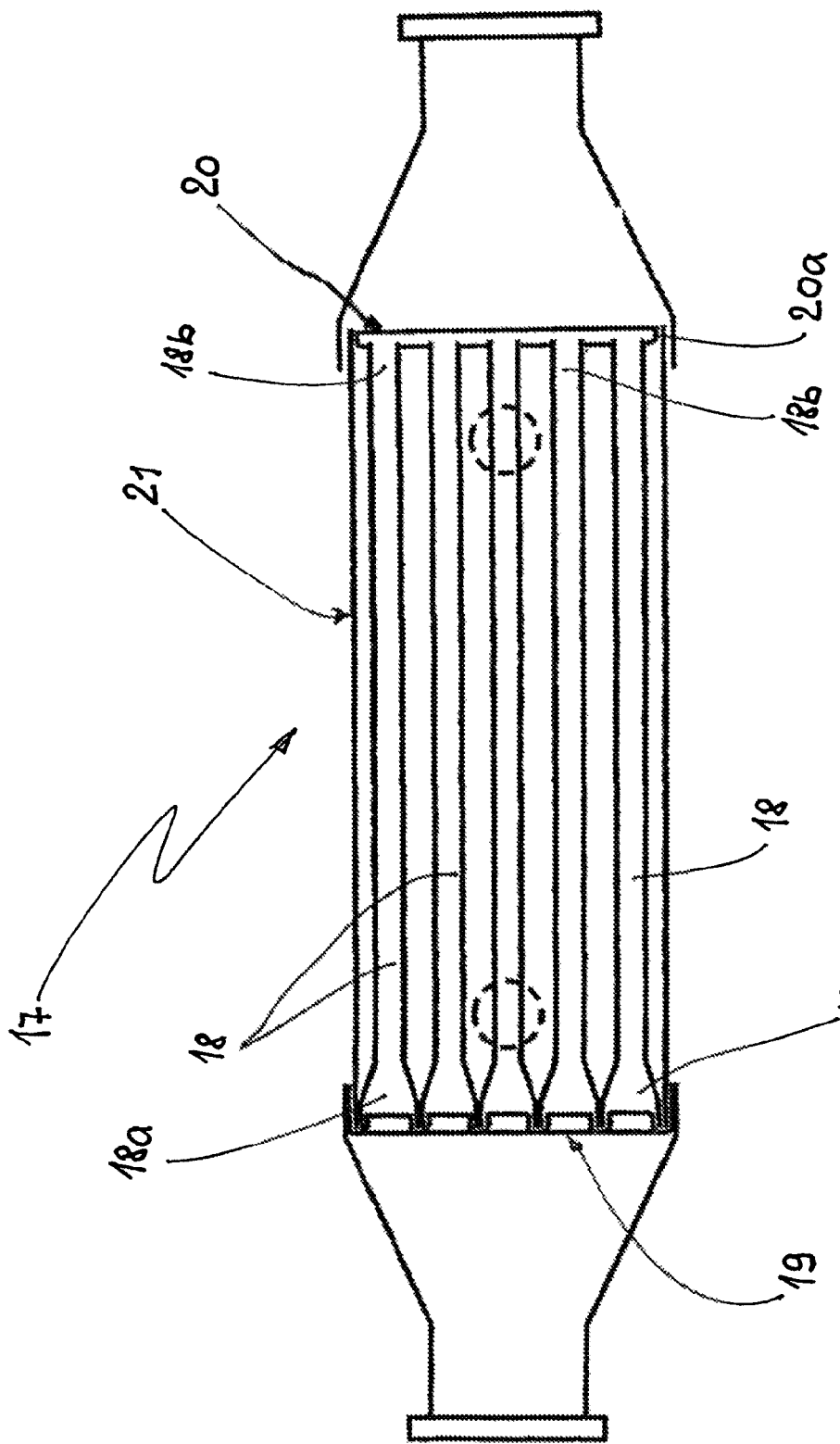
FIG. 4 shows a modified embodiment of an exhaust gas cooler with flared tube ends only at one side.

FIG. 1 shows a heat exchanger which is embodied as an exhaust gas cooler 1, as can be used for example in exhaust gas recirculation for motor vehicles. The cooling of the exhaust gas takes place here by means of a liquid coolant which can be extracted from a cooling circuit (not illustrated) of the internal combustion engine of the motor vehicle. The exhaust gas cooler 1 has a housing casing 2 in which a plurality of exhaust gas tubes 3, that is to say tubes through which exhaust gas can flow, are arranged in such a way that there remain between them gaps 4 through which coolant can flow. Coolant connections 5, 6 are indicated by dashed lines and are situated in the housing casing 2. The exhaust gas tubes 3 are flared at both ends to form funnel-shaped and rectangular tube ends 3a, 3b. Adjacent tube ends 3a, 3b bear sealingly against one another in each case at their flat longitudinal sides 3c, 3d and, there, form in each case one solder gap. The tube ends 3a, 3b are held in and soldered to tube plates 7, 8. The tube plates 7, 8 are preferably embodied as deep-drawn parts and are plugged onto the tube ends 3a, 3b. The tube plates 7, 8 have rim holes 7a, 8a in the same number and shape as the tube ends 3a, 3b, so that in each case one rim hole 7a, 8a engages into a flared tube end 3a, 3b and bears against the inner side thereof to form a solder gap. In addition, the tube plates 7, 8 have an encircling turned-up edge 7b, 8b which surrounds the housing casing 2 at the end side and thereby likewise forms a solder gap. The tube plates 7, 8 are adjoined by an exhaust gas inlet connecting piece (diffuser) 9 and an outlet connecting piece 10. The latter have in each case an encircling edge region 9a, 10a which engages around the edge 7b, 8b of the tube plates 7, 8 and forms a solder gap with said tube plater 7,8. It is therefore possible for all of the parts mentioned to be positively positioned and fixed relative to one another such that subsequent soldering in a soldering oven (not illustrated) is possible. For this purpose, solder materials (not illustrated) are to be deposited at the points to be soldered, for example in the form of solder foils or solder platings. The exhaust gas cooler 1 is preferably produced from high-grade steel—on account of the aggressive exhaust gases—with it for example being possible for nickel-based solders to be used for soldering.

FIG. 2 shows the tube plate 7 or 8 as an individual part. The tube plate 7 is produced as a deep-drawn part and has, in its inner region, a row of rim holes 7a which have the shape of the flared tube ends 3a and 3b, but are formed to be slightly smaller in cross section so that the rim holes 7a can be inserted into the flared tube ends 3a (as illustrated in FIG. 1). The flared tube ends 3a, 3b are thereby firstly securely held and are secondly provided with erosion protection with respect to the approaching flow of exhaust gas. The outer edge 7b corresponds in cross section to that of the housing casing 2, so that a narrow region of contact against the latter is generated. Secure and sealed soldering is generated by means of the rim holes 7a which nestle against the inner side of the flared tube ends 3a even in the corner radii.

FIG. 3 shows various exemplary embodiments a) to f) for flat tube cross sections of exhaust gas tubes. Embodiment a) shows a rectangular cross section with one welded longitudinal seam 11a, embodiment b) shows a rectangular cross section 12 with two opposite welded longitudinal seams 12a, 12b. Embodiment c) shows a rectangular cross section for an exhaust gas tube which has a lateral solder fold 13a at the narrow side. Embodiment d) shows a rectangular cross section 14 with two opposite solder seams 14a, 14b on the narrow sides. Embodiment e) shows a rectangular cross section 15 with one soldered longitudinal seam 15a, in which a laterally projecting fold is generated. Embodiment f) shows a rectangular cross section 16 with two soldered, oppositely situated longitudinal folds 16a, 16b—the overall cross section is therefore constructed from two half-shells. As already mentioned, the soldering of the cross sections 13, 14, 15, 16 can take place at the same time as the soldering of the entire heat exchanger.

FIG. 4 shows a modified embodiment of the invention, with only one side of the exhaust gas tubes being flared. The exhaust gas cooler 17 has exhaust gas tubes 18, likewise with a rectangular cross section, which are flared at one side to form funnel-shaped tube ends 18a, while the tube ends 18b on the opposite side are not flared. Plugged onto the flared tube ends 18a is a tube plate 19 which corresponds in its design to the exemplary embodiment as per FIGS. 1 and 2. The non-flared tube ends 18b are held by a tube plate 20 which has an encircling turned-up edge 20a which bears against the inner side of the housing casing 21—the tube plate 20 is thus inserted into the housing casing 21. The tube ends 18b are held in and soldered into the tube plate 20 in a manner known per se. The illustrated exhaust gas cooler 17 otherwise corresponds to the exemplary embodiment as per FIG. 1.

FIG. 5 shows an individual exhaust gas tube 22 with a flat rectangular cross section and with rectangularly flared tube ends 22a, 22b at both sides.

FIG. 6 shows an internal corrugated fin 23 which is of approximately trapezoidal design in cross section and which can be inserted into the exhaust gas tube 22 in the direction of the arrow P and which is dimensioned such that, with its corrugation peaks, it bears against the inner wall of the exhaust gas tube 22 and can be soldered thereto. Corresponding solder material (not illustrated) must therefore be deposited.

The internal corrugated fin 23 firstly increases the heat transfer of the exhaust gas on the inner side of the tube and secondly provides the tube with a greater level of internal pressure resistance. In contrast to the illustrated corrugated fin 23, it is also possible for a so-called web fin with offset flanks or a so-called turbulence plate to be inserted into the exhaust tube 22. The funnel-shaped flaring of the tube end 22a facilitates the insertion and also permits automated production.

The heat exchanger illustrated in FIGS. 1 and 4 is an exhaust gas cooler and/or a charge-air cooler and/or a coolant cooler and/or an oil cooler and/or a condenser for an air-conditioning system and/or a gas cooler of an air-conditioning system and/or an evaporator of an air-conditioning system.

The heat exchanger and/or the tubes, the at least one tube plate 7, 8 and/or the housing casing, as illustrated in FIGS. 1 and 4, are formed at least in regions or entirely from metal, in particular from aluminum, steel, such as for example high-grade steel, or from plastic or from ceramic or from a fiber composite material.

The heat exchanger has at least one bypass tube. The bypass tube is formed at least in regions or entirely from metal, in particular from aluminum, steel, such as for example high-grade steel, or from plastic or from ceramic or from a fiber composite material. The bypass tube serves for bypassing medium, in particular exhaust gas, charge air, oil, coolant or refrigerant, such as for example $CO_2$, which is not to be cooled. The bypass tube is integrated into the heat exchanger and/or is formed in one piece with the heat exchanger. In another exemplary embodiment, the bypass tube is not formed in one piece with the heat exchanger and conducts the medium, in particular exhaust gas, charge air, oil, coolant or refrigerant, past the heat exchanger.

The invention claimed is:

1. An exhaust gas heat exchanger for motor vehicles, comprising:
   tubes configured to be traversed by a gas and which are arranged in a housing casing and around which a liquid coolant can flow, and
   at least one tube plate, wherein the tubes have tube ends which are held by openings in the at least one tube plate,
   wherein the tubes are flat tubes,
   wherein the tube ends, at least one side of the tubes, are flared to form an approximately rectangular cross section,
   wherein the flared tube ends have a longitudinal side,
   wherein the flared tube ends are arranged such that adjacent flared tube ends bear sealingly against one another at the flat longitudinal sides of the flared tube ends to form a row of connected tubes,
   wherein the flared tube ends are soldered to the at least one tube plate.

2. The heat exchanger as claimed in claim 1, wherein the longitudinal sides of the flared tube ends are flat and are arranged such that the flat longitudinal sides of the flared tube ends lie adjacent to one another.

3. The heat exchanger as claimed in claim 1, wherein the at least one tube plate is embodied as a deep-drawn part with an encircling frame and with holding openings for the flared tube ends.

4. The heat exchanger as claimed in claim 3, wherein the holding openings are rectangular holes with rims formed by the at least one tube plate that surround each hole,
    wherein the rims of the at least one tube plate are inserted into the flared tube ends.

5. The heat exchanger as claimed in claim 4, wherein the rims bear against inner sides of the flared tube ends.

6. The heat exchanger as claimed in claim 1, wherein the tube plates can be soldered to the housing casing.

7. The heat exchanger as claimed in claim 1, wherein the tubes are welded tubes with at least one longitudinal seam.

8. The heat exchanger as claimed in claim 1, wherein the tubes are solderable tubes and have at least one longitudinal connecting seam.

9. The heat exchanger as claimed in claim 1, wherein devices for improving the heat transfer are inserted into the tubes and soldered to the tubes.

10. The heat exchanger as claimed in claim 9, wherein the devices for improving the heat transfer are turbulence inserts or internal corrugated fins.

11. The heat exchanger as claimed in claim 1, wherein the tubes have integrally formed structural elements.

12. The heat exchanger as claimed in claim 11, wherein the integrally formed structural elements are winglets.

13. The heat exchanger as claimed in claim 1, wherein the tubes further include non-flared tube ends,
    wherein the non-flared tube ends are held by an insertable tube plate.

14. The heat exchanger as claimed in claim 1, wherein connecting pieces, an inlet diffuser and an outlet diffuser, which can be soldered to at least one of the at least one tube plate and the housing casing, are arranged in a flow direction upstream and downstream of the at least one tube plate.

15. A method for producing a heat exchanger, as claimed in claim 1, wherein:
    flat tubes are flared at an end side and are bundled to form a tube bundle,
    tube plates are pushed over the flared tube ends,
    the tube bundle and the tube plates are positioned in the housing casing,
    connecting pieces are positioned with and fixed to at least one of the housing casing and the at least one tube plate, and
    an entirety of soldered portions of the heat exchanger is soldered in one working step.

16. The method as claimed in claim 15, wherein turbulence inserts or internal corrugated fins are inserted into the flat tubes via the flared tube ends and are co-soldered.

* * * * *